United States Patent [19]

Bostick et al.

[11] Patent Number: 5,253,344
[45] Date of Patent: Oct. 12, 1993

[54] METHOD AND APPARATUS FOR DYNAMICALLY CHANGING THE CONFIGURATION OF A LOGICALLY PARTITIONED DATA PROCESSING SYSTEM

[75] Inventors: James E. Bostick, Poughkeepsie; Roger E. Hough, Highland; Suzanne M. John, Poughkeepsie; Jeffrey P. Kubala, Poughquag; Karen M. Noonan; Norman E. Shafa, both of Poughkeepsie; Ira G. Siegel, New Paltz, all of N.Y.

[73] Assignee: International Business Machines Corp., Armonk, N.Y.

[21] Appl. No.: 755,246

[22] Filed: Sep. 5, 1991

[51] Int. Cl.⁵ .............................................. G06F 13/00
[52] U.S. Cl. .................................... 395/275; 395/325; 364/949.4; 364/DIG. 2
[58] Field of Search ............... 395/725, 325, 650, 200, 395/425, 275; 340/825.5; 370/85.2

[56] References Cited

U.S. PATENT DOCUMENTS

| | | | |
|---|---|---|---|
| 4,541,043 | 9/1985 | Ballegeer et al. | 364/200 |
| 4,779,194 | 10/1988 | Jennings et al. | 364/200 |
| 4,815,031 | 3/1989 | Furukawa | 364/900 |
| 4,843,541 | 6/1989 | Bean et al. | 364/200 |
| 4,858,117 | 8/1989 | DiChiara et al. | 364/200 |
| 5,027,271 | 6/1991 | Curley et al. | 364/200 |
| 5,155,837 | 10/1992 | Liu et al. | 395/500 |
| 5,170,472 | 12/1992 | Cwiakala et al. | 395/275 |

*Primary Examiner*—Michael R. Fleming
*Assistant Examiner*—Gopal C. Ray
*Attorney, Agent, or Firm*—William B. Porter

[57] ABSTRACT

A request is made by a system in a first logical partition, within a logically partitioned data processing system, to dynamically change the I/O configuration of the host system in a way that affects a system in a second logical partition. The hypervisor intercepts the request, ensures the serialization of such dynamic I/O requests, and allows dynamic reconfiguration to proceed. Subsequently, the hypervisor determines the effect of the reconfiguration on the second partition, and notifies the second partition of the change.

12 Claims, 8 Drawing Sheets

FIG. 9B

| STATE | TYPE | DESCRIPTION |
|---|---|---|
| 0 | OPEN | DISABLED (AND IDLE) |
| 1 | CLOSED | BEING ENABLED OR DISABLED |
| 2 | OPEN | ENABLED AND IDLE |
| 3 | CLOSED | MAKE FUNCTION ACTIVE |
| 4 | OPEN | FUNCTION PENDING WAITING FOR LOCKS |
| 5 | CLOSED | CHECK COUNT |
| 6 | CLOSED | MAKE REAL FUNCTION ACTIVE |
| 7 | CLOSED | ISSUE SERVICE PROCESSOR REQUEST AND IGNORE UNSOLICITED INTERRUPTIONS |
| 8 | OPEN | WAITING FOR REAL STATUS SUBCHANNEL ACTIVE |
| 9 | OPEN | WAITING FOR REAL STATUS FUNCTION PENDING |
| 10 | CLOSED | DRAIN ANY REAL STATUS, UPDATE FUNCTION PENDING |
| 11 | CLOSED | REBUILD SYSTEM CONTROL BLOCKS |
| 12 | CLOSED | FILTER RESPONSE AND MAKE STATUS PENDING |
| 13 | CLOSED | UNLOCK PICLs |
| 14 | OPEN | STATUS PENDING |
| 15 | CLOSED | CHECK FOR ADDITIONAL REAL PENDING STATUS |
| 16 | CLOSED | UNABLE TO OBTAIN PICLs-CHECK COUNT |
| 17 | CLOSED | MAKE INVALID RESPONSE PENDING |
| 18 | CLOSED | MAKE UNSOLICITED STATUS PENDING |
| 19 | CLOSED | MAKE ERROR PENDING FOR SERVICE PROCESSOR REQUEST FAILURE |
| 20 | CLOSED | CHECK FOR ANY PENDING UNSOLICITED STATUS |

NOTE: AN OPEN STATE IS ONE FROM WHICH MORE THAN ONE PROCESS CAN ATTEMPT TO MAKE A TRANSITION. A CLOSED STATE IS ONE FROM WHICH ONLY ONE PROCESS CAN ATTEMPT TO MAKE A TRANSITION. COMPARE AND SWAP IS REQUIRED TO MAKE SUCH A TRANSITION.

NOTE: ANY PROCESS WHICH CHANGES THE STATE FROM AN OPEN ONE IS DOCUMENTED WITH A LIST OF STATES AND WHAT TO DO FOR EACH.

FIG. 8

| AMCCODE | AMCLPNUM | AMCDLSNM |
|---|---|---|

METHOD AND APPARATUS FOR DYNAMICALLY CHANGING THE CONFIGURATION OF A LOGICALLY PARTITIONED DATA PROCESSING SYSTEM

FIELD OF THE INVENTION

This invention relates to the field of computers and computer system complexes comprising a logically partitioned processor governed by a hypervisor. More particularly, this invention provides a mechanism for handling dynamic I/O reconfiguration requests in a logically partitioned environment.

BACKGROUND ART

In a logically partitioned computer processor, such as IBM's PR/SM-LPAR, a plurality of operating systems operate in logical partitions, with the partitions controlled by a hypervisor. Such an approach is described in U.S. Pat. No. 4,843,541, "Logical Resource Partitioning of a Data Processing System", by Bean, et al., assigned to the assignee of the present invention, and incorporated herein by reference. In such an environment, each operating system operates to a very large degree independently, with its own resources, and with the hypervisor intercepting requests for certain privileged operations, and reissuing them (perhaps in a changed form) on behalf of the requesting operating system/partition.

In most prior art environments, the physical I/O configuration (channels, channel paths, devices, etc.) is "static" in that major configuration changes/redefinitions could only be made by stopping active work on the system, redefining the configuration, then reinitializing (IPLing) the system with the new configuration. In such environments, a role of the hypervisor is to map a partition's logical view of the (static) system configuration to the physical configuration, intercept and reissue I/O operation requests, pass along (to the appropriate partition) error indications, etc.

Recently, inventions have been made that enable an operating system to make and/or tolerate dynamic changes to the systems physical I/O configuration. Exemplary of these mechanisms are those described in a series of copending applications related to IBM's ESA/390 systems and MVS/ESA Operating Systems: "Method and Apparatus for Dynamic Changes to System I/O Configuration", Ser. No. 07/676,603, by S. M. Benson, et al.; "Dynamically Changing a System I/O Configuration Definition", issued as U.S. Pat. No. 5,170,472, on Dec. 8, 1992, by R. Cwiakala, et al.; "Establishing and Restoring Resources in a Data Processing I/O System", Ser. No. 07/754,859, (filed Sep. 4, 1991), by T. E. Cook, et al. All these applications are assigned to the assignee of the present invention, and are incorporated herein by reference. Dynamic I/O gives an operating system the ability to add, delete or modify the definition of devices, control units and channel paths without a hardware or software re-IML, or re-IPL. Dynamic I/O allows the installation to add new devices with less disruption, or having to wait for a scheduled outage. The user interface for Dynamic I/O Configuration, in the environment of the aforementioned applications, is through MVS/ESA. MVS/ESA has an interactive front-end guide called the Hardware Configuration Dialog (HCD) function. HCD allows the user to define the hardware configuration to MVS. The output of the HCD is an I/O Definition File (IODF). The IODF contains the I/O definition. The dynamic configuration feature provides the user with an ACTIVATE capability. When the user wants to run with a new I/O configuration, he enters the ACTIVATE command in the HCD and specifies the IODF he wishes to use. The HCD compares the current active configuration with the target configuration and builds a list of changes required. MVS/ESA then validates the changes, requests I/O configuration changes, updates MVS/ESA control blocks, and downloads a new IOCDS to the Processor Controller DASD. In a hypervisor environment in which the operating systems in the partitions are capable of dynamic modifications to the physical system's I/O configuration, novel situations are presented which call for decisions as to how the hypervisor will react to the proposed dynamic changes.

It is therefore an object of the present invention to provide a method and apparatus by which a hypervisor can control and respond to dynamic I/O reconfigurations by an operating system in a partition.

It is a further object of this invention to permit continued operation by systems in other partitions during dynamic changes to a system's I/O configuration by a system in a then controlling partition.

It is still a further object of this invention to minimize the involvement of the hypervisor in dynamic changes to a systems configuration by a then controlling partition, until after the changes have been effected.

SUMMARY OF THE INVENTION

In operation, the PR/SM hypervisor first ensures that dynamic reconfiguration requests are serialized (i.e., that only one logical partition at a time can perform dynamic reconfiguration). Next—and counter to the usual philosophy of hypervisors—the (authorized) partition is permitted to reconfigure (add/delete/modify) system resources, even those affecting other partitions. The hypervisor becomes actively involved only after the changes are made—determining what partitions are affected, and notifying them appropriately. All partitions continue to operate while the changes are made.

DESCRIPTION OF THE DRAWINGS

FIG. 8 is a control block diagram showing the structure of the Add-Modify CRW structure (BFYAMC).

FIG. 9B is a table defining the states in the state diagram of FIG. 9A.

DESCRIPTION OF THE PREFERRED EMBODIMENT

The preferred embodiment of the present invention is described within the framework of a logically partitioned IBM ESA/390 processing system, using the MVS/ESA operating system within the logical partitions.

Processor Resource/System Manager (PR/SM) is IBM's name for the system facilities that enable the logical partitioning of a processor complex. When PR/SM is installed, the processor complex (or side of a physically-partitioned processor complex) can be initialized for logically-partitioned (LPAR mode) operation. When the LPAR mode of operation is selected, the operator can define the resources that are to be allocated to each logical partition. After an ESA/390 logical partition is defined and activated, MVS/ESA can be loaded into that logical partition and begin operation. This invention provides the LPAR facilities that are necessary to adapt the system so that dynamic configuration changes can be made successfully in an LPAR mode operating environment.

In this description, the term LPAR hypervisor (or LPAR) is used to denote the processing that is done to support the PR/SM LPAR mode of operation.

Overview

The LPAR hypervisor employs a passthrough approach to requests issued within the logical partition that has begun a dynamic I/O reconfiguration request. Each request is passed along to the I/O Processor (IOP) for processing by the basic Dynamic I/O facility. At the end of a Dynamic I/O reconfiguration request, the LPAR hypervisor compares the new configuration with the old one and generates channel reports to notify any other logical partitions that have been affected by the configuration changes.

Figure 9A:
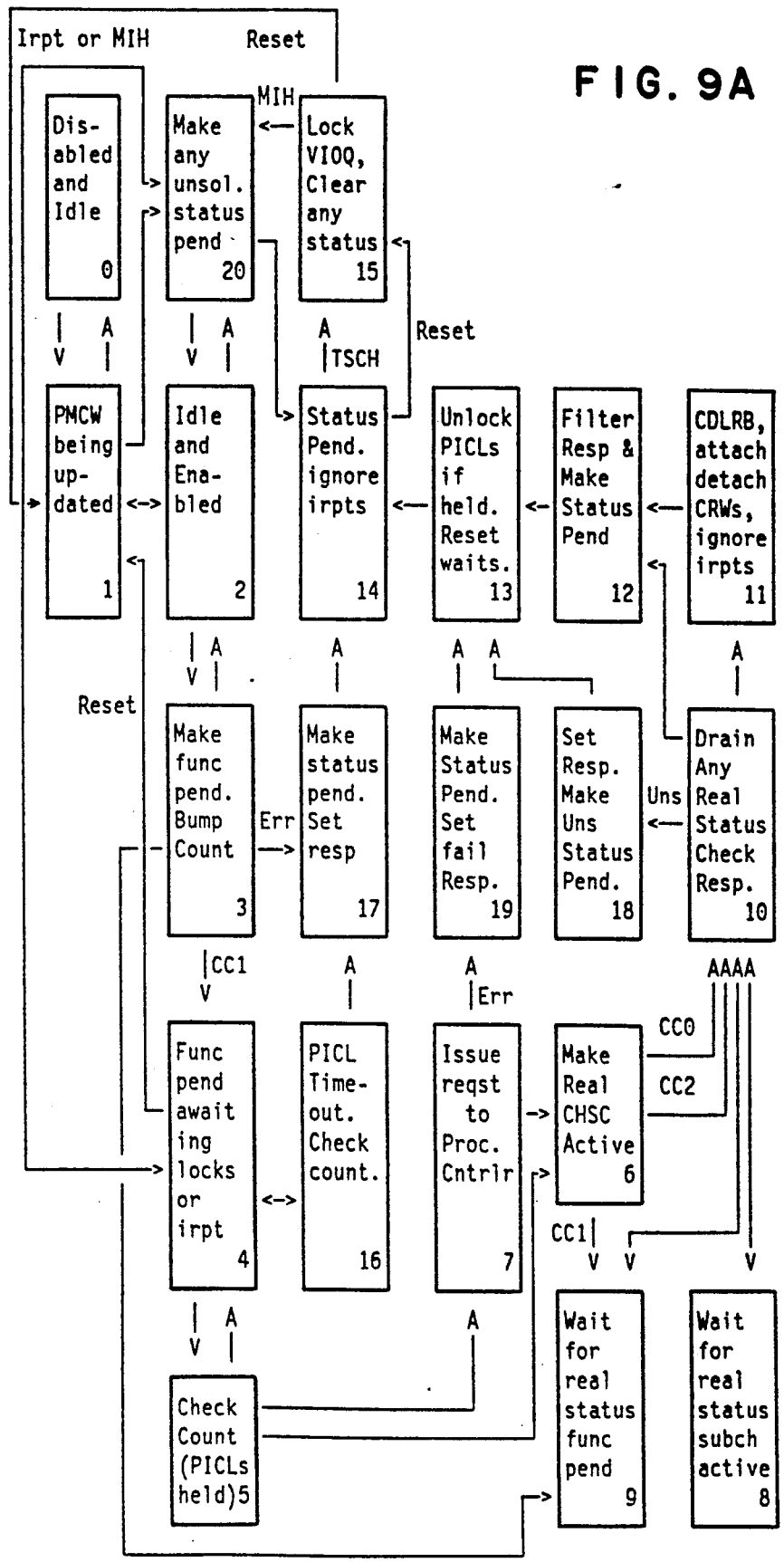
FIG. 9A is a state diagram providing a representation of the state engine for a CHSC subchannel in the present invention.

A state engine is employed to represent the subchannel for CHSC requests which enact changes in the I/O configuration. The state engine is depicted in FIG. 9A and described in detail below.

A bit map for each logical partition is employed to represent channel report words (CRWs) for each potential subchannel number that are pending for the removal of the associated subchannel number from the logical partition, either as the result of dynamic I/O reconfiguration, or as the result of deconfiguring a channel path from the logical partition. Channel reports exist in the prior art, for example, see the IBM publication IBM System/370 Extended Architecture Principles of Operation IBM publication number SA22-7085), page 17-15.

A subchannel extension containing an Add/Modify code is employed to represent channel report words(CRWs) that are pending for the addition or alteration of the subchannel, either as the result of dynamic I/O reconfiguration, or as the result of configuring a channel path into a logical partition. Manipulation of the states of this code is defined through the use of a state engine.

In order to change the current I/O definition, a partition must be given the proper authorization. This authorization is administered on the Logical Partition Security (LPSEC) frame.

In LPAR mode, each authorized partition is allowed to enter configuration mode via the HCD running in MVS. Only one partition is allowed to be in configuration mode at a time. The partition running in configuration mode may add or delete I/O devices, control units and channel paths for itself, or for other partitions.

At a level below the HCD user interface, I/O is added, deleted, and modified via Channel Subsystem Call commands (CHSCs). The general format of a channel subsystem call command is as follows: There are two pieces: a command-request block, and a command-response block. In storage, the command-request block is found first, followed immediately by the command-response block. The command-request block contains information necessary to execute a channel subsystem call. One piece of information that every CHSC has in its command-request block is the command code. This indicates which command is to be executed. Other information in the command-request block is specific to the command being issued. The command-RESPONSE block contains specific information filled-in by the I/O subsystem and/or the LPAR hypervisor after the CHSC is executed. A response code and other supporting data are found here.

The following are the CHSC commands that an operating system running in a logical partition would use for performing Dynamic I/O reconfigurations on an ESA/390 system.

Change Configuration Mode
Change Channel Path Configuration
Change Control Unit Configuration
Change I/O Device Configuration
Store Configuration Information Principles of this invention that relate to adapting Dynamic I/O to operate in a logically partitioned (LPAR) system environment.

The LPAR hypervisor maintains the status of the CHSC Subchannel in its storage so that it can synchronize activity between the partition, the Processor Controller (PCE), and the channel subsystem (CSS). The CHSC subchannel in LPAR storage is necessary because of the asynchronous commands used in Dynamic I/O, and the LPAR hypervisor's need to update its own control blocks.

The status which LPAR maintains includes a multi-bit lock to control the processing of the CHSC subchannel. MODIFY SUBCHANNEL (MSCH) and STORE SUBCHANNEL (STSCH) are instructions known in the prior art that can be executed against the CHSC subchannel. A MSCH/STSCH lock is used to interlock the information between MSCH and STSCH.

CHSC commands that cause the Processor Controller to participate in the processing, such as Add Channel Path and Delete Channel Path, leave the CHSC subchannel in the function-pending and not-active state while that processing is in progress. This subchannel state is necessary because of the possibility of receiving unsolicited status on the actual CHSC subchannel, where function-pending must be 1 and subchannel active must be zero.

The CRWs for new and modified devices are not presented to the logical partitions that are not in configuration mode until configuration mode is successfully ended for the logical partition in configuration mode. The purpose of waiting for the ending of configuration mode is to lessen the amount of confusion in case the logical partition in configuration mode adds and deletes the same subchannels from the same logical partition. While the logical partition could issue STSCHs to discover the existence of new devices, it would then be up to the logical partition to realize that this device could "disappear" at any time while configuration mode processing is taking place. A logical partition in configuration mode receives notification of any new subchannels in its CHSC command-response block, so it does not need CRWs for notification.

Logical Partition system reset on CHSC subchannels will be complete before Logical Partition system reset starts on I/O subchannels. This sequencing leaves the CHSC subchannel disabled during I/O subchannel processing and lessens the chance of CHSC interference in I/O subsystem processing.

The LPAR hypervisor passes the Logical Partition ID (LPID) of a channel path to the processor controller prior to issuing the CHSC command to Add Channel Path because this information is not otherwise available to the processor controller.

It is important that a channel path be deconfigured before it is deleted. Therefore, on all Delete Channel Path CHSC commands, the LPAR hypervisor deconfigures the channel path if it is still configured at the time that the LPAR hypervisor receives the CHSC for Delete Channel Path. If the CHSC command for Delete Channel Path fails after the LPAR hypervisor has deconfigured the channel path, the channel path will remain deconfigured.

The Store Configuration Information command returns the LPID of the logical partition in configuration mode. The CSS puts the LPID in for the LPAR hypervisor's recovery processing. In LPAR mode, the hypervisor is responsible for clearing the LPID from the command-response block before giving the response to the requesting logical partition. This command also returns an LPID/logical partition name map which the LPAR hypervisor must clear unless the requesting logical partition is the one in configuration mode.

A logical partition can be allowed to add, delete and modify devices in the I/O configurations of other logical partitions. A logical partition is given authorization to redefine its own I/O, or the I/O of other logical partitions via the LPSEC frame.

If a logical partition has a device added to its configuration, it is not notified about the new device until configuration mode is completed. This notification is provided via a CRW. If a logical partition has a device deleted from its configuration, the logical partition is notified immediately via a CRW; the idea being that the logical partition, when notified of the deletion immediately, will not try to use the deleted device any longer. If a deleted device CRW is not processed, a new device added on the same subchannel, while still in configuration mode, will not be known to the logical partition until the deleted device CRW is processed.

Dynamic I/O Functions

Figure 1:
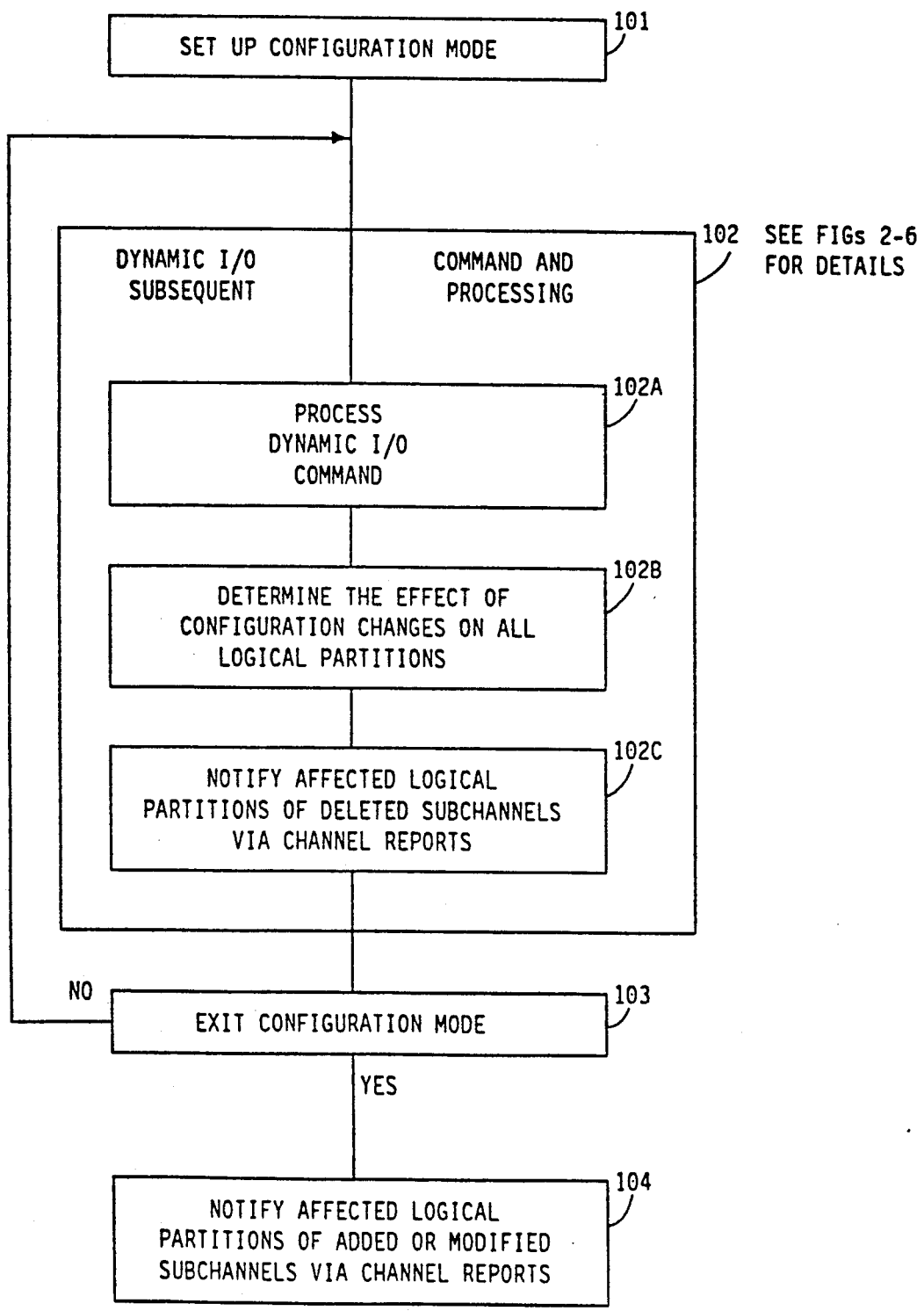
FIG. 1 is a flowchart showing the method by which the hypervisor manages dynamic changes, by a partition, to the system's I/O configuration.
Figure 2:
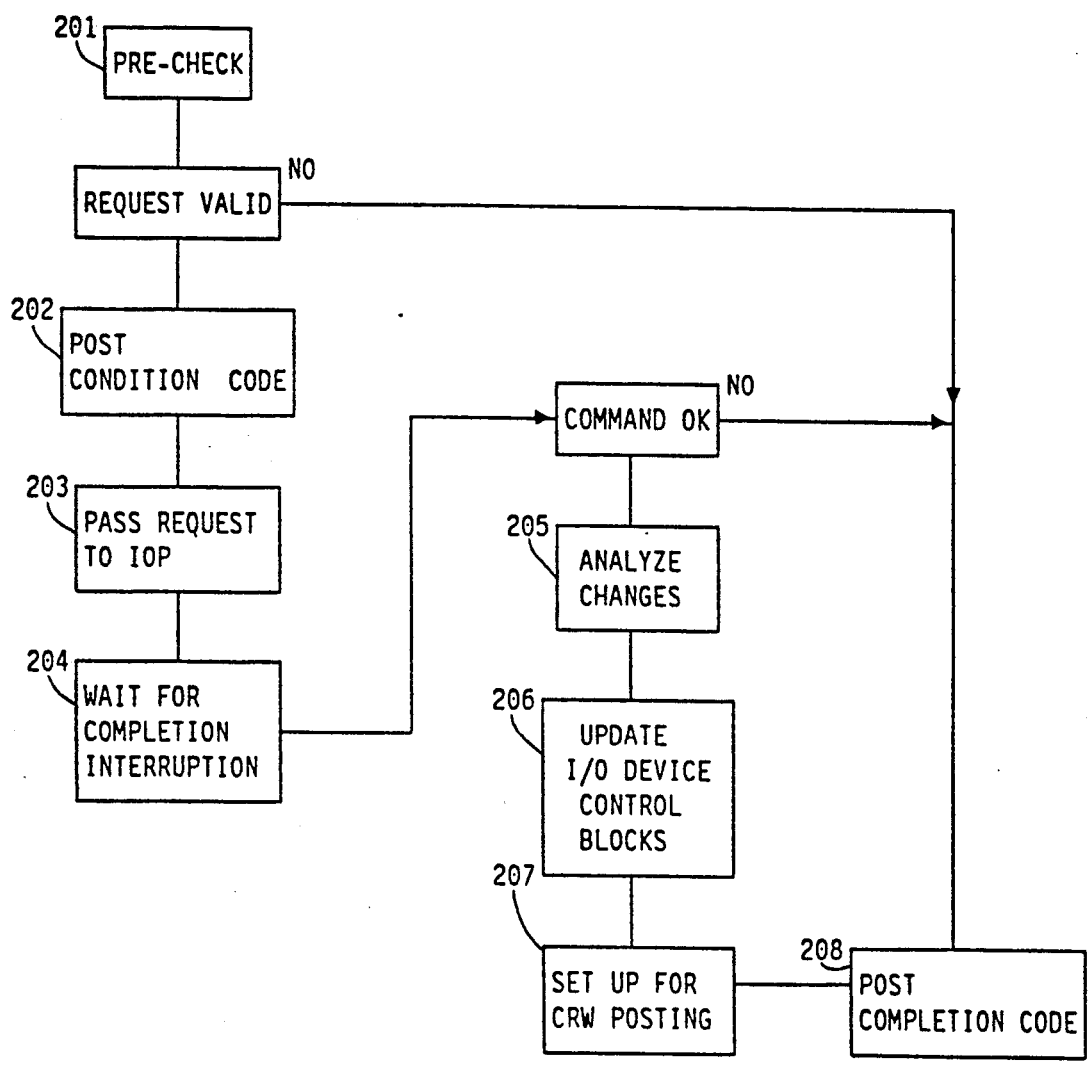
FIG. 2 is a flowchart showing processing by the hypervisor of requests by a system in a partition for a change to the system's I/O configuration that does not involve the PCE.
Figure 3:
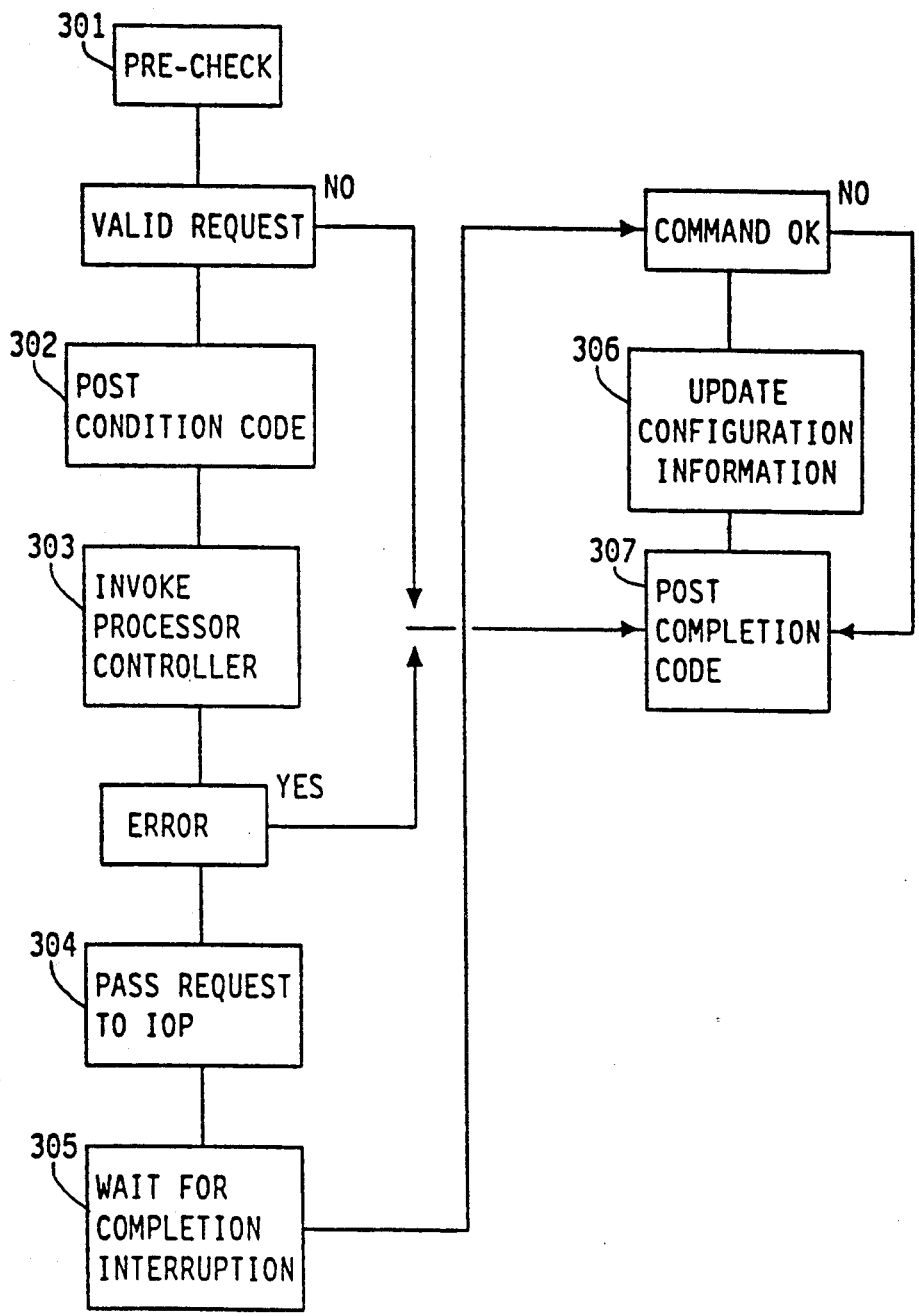
FIG. 3 is a flowchart showing processing by the hypervisor of requests by a system in a partition for the addition or deletion of a channel path (involving the PCE).
Figure 4:
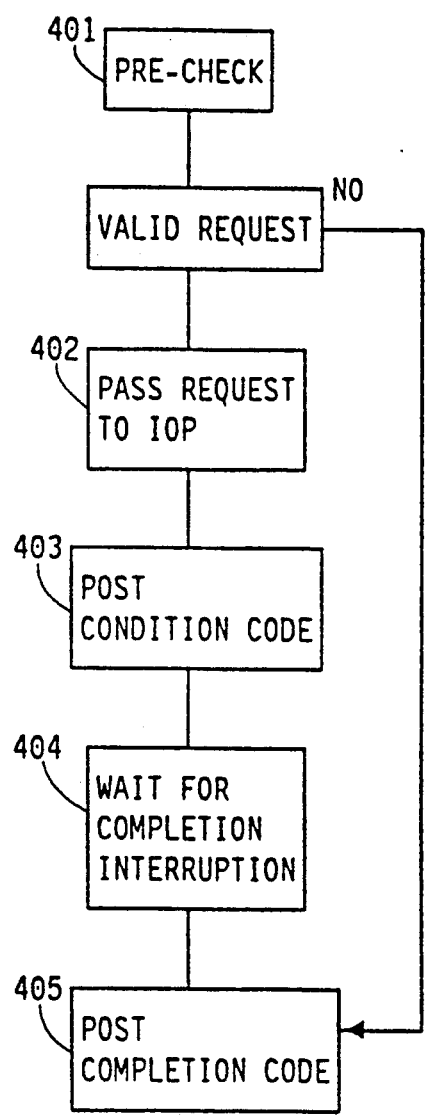
FIG. 4 is a flowchart showing processing by the hypervisor of requests for informational CHSC commands by a system in a partition.
Figure 5:
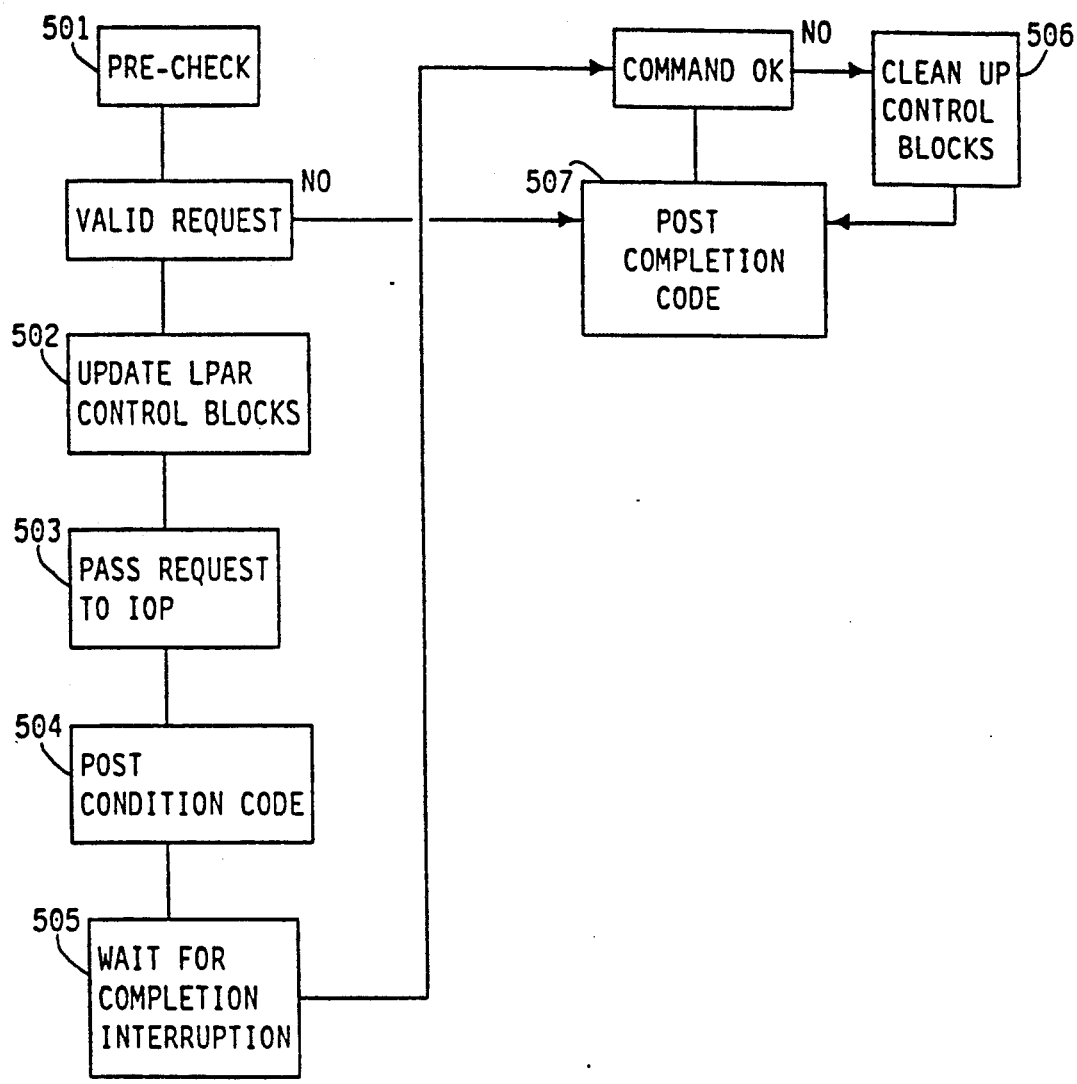
FIG. 5 is a flowchart showing processing by the hypervisor of requests by a system in a partition to enter configuration mode.
Figure 6:
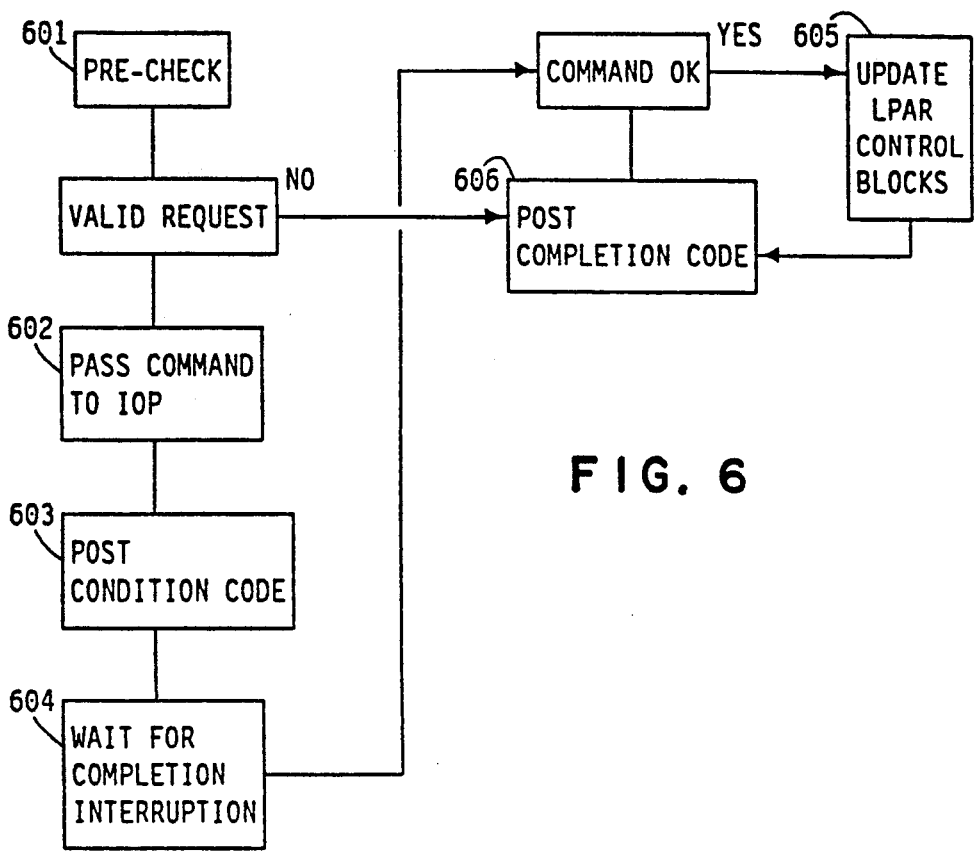
FIG. 6 is a flowchart showing processing by the hypervisor of requests by a system in a partition to exit configuration mode.

FIG. 1 shows a general flow of a Dynamic I/O configuration session using CHSCs.

First a logical partition enters configuration mode by executing the appropriate CHSC instruction (101). A logical partition may then modify the I/O configuration (102).

The processing of such modifications varies with the nature of the modification—possible modification cases are shown in FIG. 2–FIG. 6, and described below. The processing outlined at 102 in FIG. 1 summarizes this more detailed processing.

To modify the I/O configuration, the logical partition issues a CHSC instruction requesting a change (102A). LPAR passes the request to the channel subsystem to allow it to perform the requested change. After the channel subsystem makes the requested I/O configuration change, the LPAR hypervisor determines the effect of the configuration change on all the logical partitions (102B). The LPAR hypervisor does this by examination of the channel subsystem control blocks. These channel subsystem control blocks are in Hardware System Area (HSA). The LPAR hypervisor then updates its view of the I/O configuration. Other logical partitions are notified via channel report words of any deleted subchannels(102C). The logical partition can then make additional requests to change the I/O configuration, or end the I/O reconfiguration session by issuing the appropriate CHSC instruction (103). After the I/O configuration session is completed, the LPAR hypervisor notifies other logical partitions of subchannels added or modified via channel report words, CRWs(104).

CRWs for devices added, modified, or deleted are not presented to the logical partition in configuration mode, which receives a list of subchannels added, modified, or deleted in each CHSC command response block.

CRWs are not presented to System/370 mode logical partitions (that is, logical partitions that do not operate in S/370-XA, ESA/370, or ESA/390 mode.).

There are five categories of Dynamic I/O CHSC commands. These commands are processed as described below and summarized in FIGS. 2 through 6.

1. Changes I/O configuration but does not involve Processor Controller

Pre-check validity of request block 201, such as feature installed and requesting logical partition being in configuration mode. If error is found, then return a response code describing the error and post the completion code 208. If no error, then post condition code 202 and pass the request to the I/O processor (IOP) 203. Wait for the completion interruption 204. If the command executed successfully, then analyze the changes to the configuration by comparing the device-number valid bit, the path-installed mask, and the configured-path mask to their previous values for each subchannel 205. Update the LPAR hypervisor's I/O device control blocks as appropriate 206, and set up for channel report word (CRW) notification by updating the BFYAMC array and the BFYCBM array 207. Post completion code 208.

2. Add/Delete channel path (Involves the Processor Controller

Pre-check validity of request block 301, such as feature installed and requesting partition being in configuration mode. If error is found then return a response code describing the error, and post the completion code 307. If no error then post condition code 302. In the case of an Add Channel Path command, the logical partition ID is passed to the Processor Controller 303. In the case of a Delete Channel Path command the Processor Controller is signalled to deconfigure the channel path, if necessary 303. If not OK then post completion code 307. If OK then pass request to IOP 304. Wait for the completion interruption 305. When command executes OK, then update configuration information 306. Post completion code 307. No subchannel definition changes occur as a result of Add/Delete channel path.

3. Strictly Informational

Pre-check validity of request block 401, such as feature installed and partition in configuration mode. If error in request is found then return an appropriate response code describing the error, and post the completion code 405. If request is valid then issue the CHSC to IOP 402 and post condition code 403. On interrupt 404, post completion code 405.

4. Config On

Pre-check validity of request block 501, such as no other partitions in configuration mode, partition authorized, and request block fields contain allowed values. If error found then return an appropriate response code and post completion code 507. If pre-check passes, then update LPAR control blocks 502, and issue the CHSC to the IOP 503. Post Condition code 504. On interrupt 505, restore hypervisor's information blocks if error 506, and post completion code, 507.

5. Config OFF

Pre-check for validity of request block 601, such as requestor currently in configuration mode, and request block fields containing allowed values. If error found then return an appropriate response code and post a completion code 606. If pre-check passes then issue the CHSC to the IOP 602. Post Condition code 603. On interrupt 604, update information block 605 if command OK, and post completion code 606.

CHSC Commands

Dynamic I/O CHSC commands are executed asynchronously, so a CHSC subchannel must be specified by the CHSC instruction. When in LPAR mode, there is one of these subchannels for each possible logical partition, plus one more. A portion of an asynchronous CHSC instruction is executed synchronously and another portion is asynchronously. Successful execution of the synchronous portion results in a CC=1. In this case, an I/O interruption can be anticipated on the specified CHSC Subchannel. A CC=0 result requires analysis of the response-code field to identify the reason for the failure; the response-code field of the command-response block describes any abnormal conditions encountered.

The states of a CHSC subchannel that control the execution of all the Dynamic I/O functions in LPAR mode are shown and defined in FIG. 9A and FIG. 9B, respectively. The actual Dynamic I/O CHSC commands are described below, and the processing is summarized in Table 1.

When a change has been completed, the LPAR hypervisor will generate a subchannel installed-parameters-initialized channel report for each subchannel that provides a first path to a logical partition other than the logical partition that issued the configuration change CHSC.

When devices are added to logical partitions, CRWs are queued to the respective logical partitions and processed when the logical partition that is in configuration mode leaves configuration mode. When devices are deleted from logical partitions, CRWs are presented immediately; the LPAR hypervisor does not wait until configuration mode ends.

CRWs are queued to logical partitions other than the one operating in configuration mode. The logical partition is made aware of the CRW via a machine-check interruption. The logical partition processes the CRWs by issuing a Store CRW command. If the logical partition being affected is a logical partition operating in S/370 mode, there is no notification of devices being added or deleted, because a S/370 logical partition can not process CRWs.

After each CHSC command that generates subchannels in its response block, the LPAR hypervisor completely rebuilds its internal configuration tables. The LPAR hypervisor is not dependent for this on the subchannels in the response block.

Change Configuration Mode: Change Configuration Mode either begins or ends configuration mode. This mode must be activated to ensure successful execution of those CHSC commands that modify the I/O configuration definition in the channel subsystem. The base rules for entry into this mode are:

1. No logical partition can be already in configuration mode, including the same logical partition.
2. There must be an enabled CHSC subchannel specified in a partition.
3. The CHSC subchannel must not be busy.
4. The partition must be authorized to make configuration changes.

While in configuration mode, the change-channel-path, change-control-unit, and change-device configuration commands must be serialized with the channel-swap, configure-channel-path, and deconfigure-channel-path commands.

Change Configuration Mode either begins or ends configuration mode. This mode must be activated to ensure successful execution of those CHSC commands that modify the I/O configuration definition in the channel subsystem. These commands are:

Change channel-path configuration
Change control-unit configuration
Change I/O device configuration If the machine is operating in LPAR mode, and a system reset is issued by the operator for the logical partition that initiated configuration mode, configuration mode is reset, and the I/O configuration definition is set invalid. The LPAR hypervisor is responsible for issuing this configuration mode terminate.

When the LPAR hypervisor issues the Set Configuration Mode On command for a logical partition, byte 3 of word 1 contains the logical partition number of the program that executed this instruction. When the machine is not operating in LPAR mode, this field must be zero.

Response code '0104'X indicates that a logical partition other than the one that executed this command has already initiated configuration mode and is currently running in configuration mode. A response code of '0104'X is returned when a logical partition is initiating configuration mode while another logical partition is also attempting to enter configuration mode.

Change Channel Path Configuration: This CHSC is issued to add, delete or modify the definition of a channel path. Each of these has a set of rules associated with them. The ADD rules are as follows:

1. The channel subsystem must be in configuration mode.
2. The channel path must not be already defined.

3. The I/O definition must not contain any control unit descriptions which indicate that the control unit is attached to the channel path being added.

The DELETE rules are as follows:
1. The channel subsystem must be in configuration mode.
2. The channel path must be defined in the current configuration.
3. The I/O definition must not contain any control unit descriptions which indicate that the control unit is attached to the channel path being deleted.

The Processor Controller is signalled as a result of the IOP communicating the change request. Results of the Processor Controller actions are returned via the same mechanism and appear as response codes in the CHSC command-response block. Processor Controller involvement is needed to maintain the current assignment of channel paths to logical partitions. These dynamic I/O changes are combined with any configure-channel-path or deconfigure-channel-path reconfiguration commands.

Change Channel Path Configuration is used to modify channel path descriptions in the I/O Configuration Definition. The command has the ability to add or delete channel path descriptions.

In the command-request block, bytes 0-1 of word 6 specify which eight-byte entries in the logical-partition-names field contain valid logical-partition names.

Bytes 2-3 of word 6 specify which of the logical partitions designated by valid logical-partition names are to have initial access to the specified channel path. Bits 0-15 correspond from left to right with the 16 8-byte entries in the logical-partition-names field.

At byte 0 of word 7, the logical-partition names begin. Each of the contiguous eight-byte fields can contain an eight-character (EBCDIC) logical-partition name. Valid logical-partition names are determined by bits that are one in the candidate-logical-partitions field.

In the command-response block, certain LPAR-specific information is maintained. A response code of '0104'X occurs when the machine is in LPAR mode, and the Operation-Code Qualifier (OCQ) field of the command-request block contains a value of 2. This means that either or both of the candidate-logical-partitions or access-logical-partitions fields of the command-request block contain all zeros.

A response code of '0108'X may indicate that an add operation was specified, and the machine is operating in LPAR mode, but the OCQ does not contain a 1 or a 2.

A response code of '010C'X specifies that the machine is running in LPAR mode, and the specified channel path is the only channel path for one or more logical partitions.

Add Channel Path: In order to add a channel path definition to the I/O Configuration, the I/O Configuration definition can not contain a description of the specified channel path. Also, the I/O configuration definition can not contain any control unit descriptions that indicate that the associated control units are attached to the specified channel path. The program must have initiated configuration mode prior to adding the channel path to the I/O configuration definition.

Delete Channel Path: In order to delete a channel path from the I/O Configuration, it can not contain any control unit descriptions that indicate that the associated control units are attached to the specified channel path. The program must have initiated configuration mode, prior to deleting the channel path from the I/O configuration definition. Also, the I/O configuration definition must contain a description of the specified channel path.

Change Control Unit Configuration: This CHSC is issued to add, delete or modify the definition of a control unit. Each of these has a set of rules associated with them.

Add Control Unit: Certain rules apply to the addition of control units:

The I/O Configuration definition must not already contain a description of the specified control unit.

The I/O Configuration definition must contain a description of specified channel paths.

The I/O Configuration definition must not contain any I/O device descriptions that indicate that the associated I/O devices are attached to the specified control unit.

The program must have initiated configuration mode.

Delete Control Unit: Certain rules apply to the deletion of control units:

The I/O Configuration definition must not contain any I/O device descriptions that indicate that the associated I/O devices are attached to the specified control unit.

The I/O Configuration definition must contain a description of the specified control unit.

The program must have initiated configuration mode.

Modify Control Unit: Certain rules apply to the modification of control units:

The I/O Configuration definition must contain a description of the specified channel paths.

The I/O Configuration definition must contain a description of the specified control unit.

The program must have initiated configuration mode.

When the system is running in LPAR mode, and a channel path is added to, or deleted from, the list of channel paths that can be used to access the specified control unit and if, as a result, I/O devices that are attached to the specified control unit can be accessed differently by logical partitions other than the logical partition operating in configuration mode, all other logical partitions are notified of this event by means of a channel report.

The results of a modify control unit can contain a list of subchannels that have been added, deleted or modified as result of the command. The LPAR hypervisor updates its internal control blocks to reflect these changes.

When the system is running in LPAR mode, and a channel path is added to the list of channel paths that can be used to access the specified control unit, logical partitions other than the one in configuration mode will be notified by CRWs at the end of configuration mode of devices that are attached to the specified control unit for which access was added.

When the change to a control unit causes subchannels to be deleted, the LPAR hypervisor generates and makes immediately pending a subchannel installed-parameters-initialized CRW for each subchannel that was deleted from or for which the last path was removed from a logical partition. CRWs are not generated for the logical partition that is in configuration mode.

Change I/O Device Configuration: This CHSC is issued to add, delete or modify the definition of an I/O device. Each of these has a set of rules associated with them.

Adding a Device: Certain rules apply to adding a device to the I/O configuration definition:

The I/O configuration definition must not already contain a description of the specified I/O devices.

One or more control units must be specified and described in the I/O configuration definition.

The requesting logical partition must be operating in configuration mode.

When the system is running in LPAR mode, and I/O devices are added so that they can be accessed for the first time by logical partitions other than the logical partition that is executing in configuration mode, the other logical partitions are notified of this event by means of a channel report.

Modifying a Device: Certain rules apply to modifying a device in the I/O configuration definition:

One or more control units must be specified and described in the I/O configuration definition.

The I/O configuration definition must contain a description of the specified I/O devices.

The requesting logical partition must be operating in configuration mode.

When the system is running in LPAR mode, and I/O devices are modified so that they can be accessed for the first time by a logical partition other than the logical partition operating in configuration mode, or can be accessed differently by a logical partition other than the logical partition operating in configuration mode, the other logical partitions are notified of this event by means of a channel report.

Deleting a Device: Certain rules apply to deleting a device in the I/O configuration definition:

The I/O configuration definition must contain a description of the specified I/O devices.

The requesting logical partition must be operating in configuration mode.

When the system is running in LPAR mode, and I/O devices are deleted, that had been accessed by logical partitions other than the logical partition operating in configuration mode, the other logical partitions are notified of this event by means of a channel report.

Dynamic I/O CHSC Subchannel State Transitions

As noted, FIG. 9A shows a diagram representing the state engine for a CHSC subchannel. The states indicated in FIG. 9A are defined in FIG. 9B. The current state value is kept in the lock word that is used to serialize access to the CHSC subchannel, thus the terms "lock value," "state," and "state value" are synonymous.

The following list describes all the allowable state transitions of a CHSC subchannel depicted in FIG. 9A. The terms PICL and PICLOCK refer to a logical Partition I/O Configuration Lock that is used to serialize I/O configuration changes.

| | | |
|---|---|---|
| 0–1 | | State 0 exists whenever the CHSC Subchannel is disabled, as determined by the enablement bit in its Path Management Control Word (PMCW). Enter state 1 whenever the CHSC Subchannel PMCW is being updated. |
| 1–2 | | State 1 exists whenever the CHSC Subchannel PMCW is being updated. After the Channel System successfully completes a real MSCH for the logical partition and the LPAR hypervisor updates the logical partition's CHSC Subchannel, the value of the lock is updated to 2 if the CHSC Subchannel is enabled. |
| 1–0 | | State 1 exists whenever the CHSC Subchannel PMCW is being updated. After the Channel System successfully completes a real MSCH for the logical partition and the LPAR hypervisor updates the logical partition's CHSC Subchannel, the value of the lock is updated to 0 if the CHSC Subchannel is disabled. |
| 2–1 | | The CHSC Subchannel is enabled and idle when a logical partition issues an MSCH instruction to update the PMCW of the CHSC Subchannel. The value of the lock is changed to 1. |
| 2–20 | | The CHSC Subchannel is idle and enabled when an unsolicited interruption is received for it. The lock value is updated to 20. |
| 2–3 | | The CHSC Subchannel must be enabled and idle in order for the LPAR hypervisor to process an asynchronous CHSC instruction. The value of the lock is updated to 3 when the LPAR hypervisor begins to check for CC = 0 or CC = 1 conditions. While in state 3, logical partition system resets and unsolicited interruptions are locked out, and must spin until the state is no longer 3. |
| 3–2 | | Prior to completing the CHSC instruction processing, an error is detected. The value of the lock is changed to 2. A response code is set and the CHSC instruction completes with condition code 0, or a program exception interruption occurs, or an exigent machine check interruption occurs, or the logical CPU enters a checkstopped state. |
| 3–4 | | The CHSC instruction executed by the logical partition completes with CC = 1 and the value of the lock is updated to 4. |
| 3–9 | | An asynchronous CHSC instruction which does not alter the I/0 configuration, and for which PICLOCKs are therefore not required, is executed by the logical partition and receives a CC = 1 in response. The value of the lock is updated to 9. |
| 3–17 | | While making a function pending, an error occurs which must be reported as an asynchronous error to the logical partition. The CHSC instruction completes with condition code 1. The lock value is updated to 17. |
| 4–16 | | A PICLOCK obtainer attempts to obtain all of the PICLOCKs for all of the logical partitions as well as a global logical partition activation lock. If it is unsuccessful, the value of the lock is updated to 16. |
| 16–4 | | If this request is no longer the current asynchronous CHSC request for the logical partition, as determined by an inspection of a count in the CHSC Subchannel, a logical partition system reset has occurred while unsuccessfully attempting to obtain the locks and the value of the lock is restored to 4. |
| 4–5 | | A PICLOCK obtainer attempts to obtain all of the PICLOCKs for all of the logical partitions as well as a global logical partition activation lock. If it is successful, the value of the lock is updated to 5. |
| 4–1 | | A logical partition system reset must clear the active function and update the PMCW. The value of the lock is changed to 1. |
| 4–20 | | While the CHSC Subchannel is in a function-pending state awaiting PICLOCKs or interrupt, an unsolicited interruption is presented by the Channel Subsystem. |

-continued

| | |
|---|---|
| | The lock value is changed to 20. |
| 5–4 | If this request is no longer the current asynchronous CHSC request for the logical partition, as determined by an inspection of a count in the CHSC Subchannel, a logical partition system reset has occurred while successfully obtaining the locks and the value of the lock is restored to 4. |
| 5–7 | For a command type which must be passed to the Processor Controller before being passed to the Channel subsystem, the lock is set to a value of 7, and the command is passed to the Processor Controller. |
| 5–6 | For a command type which is not passed to the Processor Controller before being passed to the Channel subsystem, the value of the lock is changed to 6, and the command is passed to the channel subsystem. |
| 7–6 | The command passed to the Processor Controller has successfully completed. The lock value is updated to 6 before the command is passed to the Channel Subsystem. |
| 7–19 | The command passed to the Processor Controller has completed unsuccessfully. The lock is updated to 19. |
| 6–9 | The command is passed to the channel subsystem, for which the real CHSC instruction completes with CC = 1. The lock value is updated to 9. |
| 6–10 | The command is passed to the channel subsystem, for which the real CHSC instruction completes with CC = 0 or CC = 2. The lock value is updated to 10. |
| 9–10 | The LPAR hypervisor either receives an interruption from the Channel Subsystem for the CHSC subchannel, or is intercepted for a STSCH, MSCH or TSCH instruction from the logical partition and decides to inspect the status of the real CHSC Subchannel. The value of the lock is updated to 10 before the status in the real CHSC Subchannel is inspected. |
| 10–8 | The LPAR hypervisor obtains any pending status for the CHSC subchannel from the Channel Subsystem. If no status is pending and the function-pending bit is zero, then the value of the lock is changed to 8. |
| 10–9 | The LPAR hypervisor obtains any pending status for the CHSC subchannel from the Channel Subsystem. If no status is pending and the function-pending bit is one, then the value of the lock is changed to 9. |
| 10–11 | The LPAR hypervisor obtains any pending status for the CHSC subchannel from the Channel Subsystem. If status was pending and the response indicates that the command was successful, the value of the lock is changed to 11. |
| 10–12 | The LPAR hypervisor obtains any pending status for the CHSC subchannel from the Channel Subsystem. If status was pending and the response indicates that the command was unsuccessful, the value of the lock is changed to 12. |
| 10–18 | The LPAR hypervisor obtains any pending status for the CHSC subchannel from the Channel Subsystem. If unsolicited status became pending prior to execution of the command by the channel subsystem, the value of the lock is changed to 18. |
| 8–10 | The LPAR hypervisor receives an interruption for the CHSC Subchannel from the Channel Subsystem, or is intercepted for a STSCH, MSCH, or TSCH instruction from the logical partition. The value of the lock is updated to 10 before obtaining any any pending status for the CHSC subchannel from the Channel Subsystem. |
| 11–12 | After the LPAR hypervisor has updated all of its control blocks for all logical partitions whose I/O definitions changed as a result of the CHSC instruction, the lock is updated to 12. |
| 18–13 | Unsolicited status presented by the Channel Subsystem is placed into the storage in which the status is maintained for the CHSC subchannel by the LPAR hypervisor. The lock value is changed to 13. |
| 12–13 | The LPAR hypervisor presents the response from the Channel Subsystem to the logical partition, with whatever filtering is appropriate. I/O completion status is made pending for the CHSC subchannel in the storage maintained by the LPAR hypervisor. The value of the lock is changed to 13. |
| 16–17 | It was not possible to obtain the PICLOCKs. An appropriate response code is presented to the logical partition. I/O completion status is made pending for the CHSC subchannel in the storage maintained by the LPAR hypervisor. The lock is updated to 17. |
| 1–20 | Updating of the PMCW of the CHSC subchannel on behalf of an MSCH instruction by the logical partition is rejected by the Channel Subsystem due to pending status. The MSCH instruction by the logical partition is completed with CC=1 and the lock is updated to 20. |
| 13–14 | The PICLOCKs are released and the lock value is updated to 14. Reset of the CHSC subchannel for logical partition system reset, which may be accepted as soon as its PICLOCK is released, cannot proceed so long as the lock has a value of 13. |
| 14–15 | A logical partition system reset occurs while the lock is in state 14, or a TSCH instruction for the CHSC subchannel is issued by the logical partition while the lock is in state 14. The lock is updated to 15 before status is removed from the storage maintained for the CHSC subchannel by the LPAR hypervisor. Any additional, unsolicited status in the channel subsystem is held pending in the channel subsystem while the lock value is 14. |
| 15–20 | Status is cleared from the storage maintained for the CHSC subchannel by the LPAR hypervisor. The value of the lock is changed to 20 before attempting to obtain any additional, unsolicited status from the channel subsystem. |
| 15–1 | Logical Partition System reset changes the value of the lock to 1 to show that the PMCW of the CHSC subchannel is being updated. |
| 19–13 | I/O completion status is made pending for the CHSC subchannel in the storage maintained by the LPAR hypervisor after the command passed to the Processor Controller has completed unsuccessfully. The value of the lock is changed to 13. |
| 20–2 | No unsolicited status was obtained from the Channel Subsystem for the CHSC subchannel. The CHSC subchannel is idle and enabled. The value of the lock is updated to 2. |
| 20–4 | No unsolicited status was obtained from the Channel Subsystem for the CHSC subchannel. The CHSC subchannel is function pending. The value of the lock is restored to a previous value of 4. |
| 20–14 | Unsolicited status obtained from the Channel Subsystem is made pending in the |

| | -continued |
|---|---|
| | storage maintained for the CHSC subchannel by the LPAR hypervisor. |
| 17–14 | I/O completion status is made pending for the CHSC subchannel in the storage maintained by the LPAR hypervisor for an error which occurred while making a function pending, which must be reported as an asynchronous error to the logical partition. The value of the lock is updated to 14. |

Data Structures

Figure 7:
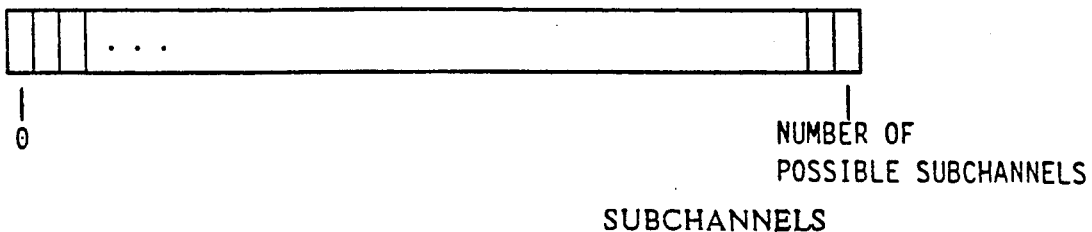
FIG. 7 is a control block diagram showing the format of the device detection CRW bit map (BFYCBM).

BFYCBM: There is one BFYCBM CRW bit map per logical partition (See FIG. 7). BFYCBM is a bit map containing one bit per possible subchannel. The length of this bit map is determined by the number of possible subchannel numbers in the machine. The bit positions in BFYCBM are numbered starting with zero, and each bit position represents the corresponding subchannel numbers. The BFYCBM is created during LPAR initialization for each logical partition in the I/O Configuration.

When a Dynamic I/O configuration change occurs that causes a partition not in configuration mode to lose access to a device, the bit position in the BFYCBM that corresponds to the number of the subchannel associated with that device is set to one. A bit set to one in BFYCBM signifies that there is a deletion CRW pending for the corresponding subchannel. When the logical partition stores a CRW which is represented in the BFYCBM, the corresponding bit in the BFYCBM is set to zero by LPAR.

BFYAMC: There is one global structure called BFYAMC, Add Modify CRW, per machine (See FIG. 8.). There is an entry for each possible subchannel in the machine. The BFYAMC array is created during LPAR initialization.

Each entry of the BFYAMC array contains the following:

AMCCODE—possible values are described in Table 2.

AMCLPNUM—specifies the logical partition to receive any CRW described by AMCCODE.

AMCDLSNM—Current session number, which is one plus the the number of completed dynamic I/O configuration sessions.

The AMCCODE for a subchannel indicates if the CRW is to be made pending, either immediately or after the configuration session has ended, and the type of CRW, either alteration or creation. (See Table 2). When the logical partition stores a CRW which is represented in a BFYAMC entry, LPAR clears the AMCCODE for the corresponding subchannel.

BFYAMC represents any pending addition and modification CRWs. Whenever a Dynamic I/O command causes a partition to receive a new device (See Table 17), or have the path-installed-masks change from one nonzero mask to another nonzero mask in a subchannel for the logical partition (See Table 7), the LPAR hypervisor updates the corresponding entry for the subchannel in the global BFYAMC to describe the pending CRW.

BFYAMC is searched only after searching BFYCBM, when storing CRWs for a logical partition. The LPAR hypervisor clears an entry in the BFYAMC when the logical partition stores a corresponding CRW for a subchannel. When a logical partition undergoes a system reset, the LPAR hypervisor clears the AMC-CODE of the BFYAMC entries for that logical partition, (See Table 4). When configuration mode is ended, the BFYAMC entries are updated so that all of the AMCCODE values specify immediate notification, (See Table 3).

When a logical partition has configured a channel path on-line such that a device previously unknown to the partition becomes accessible, then the corresponding BFYAMC entry is updated to specify immediate notification, (See Table 5).

When a subchannel is removed from the configuration, the corresponding BFYAMC entry is updated to purge notification (See Table 6).

System Reset of a Logical Partition

The reset of a logical partition that is in configuration mode results in the LPAR hypervisor issuing the change configuration mode CHSC with the request block requesting a terminate configuration mode and establishes the I/O-configuration session as incomplete.

Store Configuration Information

Store Configuration Information allows a program to obtain configuration information from the channel subsystem. The execution of this command does not change any information contained in the channel subsystem.

When the system is operating in LPAR mode, byte 3 of word 2 in the command-response block is set to the logical-partition number of the logical partition which initiated configuration mode. This field is set to zero before being presented to the logical partition. If the system is not operating in LPAR mode, byte 3 of word two of the command-response block is not used by the channel subsystem.

In LPAR mode the CSS sets the partition-names validity field and the partition-names field in the CHSC response block. If the partition is not in configuration mode, LPAR clears the partition-names validity field and the partition-names field before the response block is presented to the logical partition.

Differences Between LPAR Mode and Basic Mode

There are some differences between executing Dynamic I/O configuration commands in LPAR mode and in the basic mode of the machine.

In LPAR mode, if a logical partition is already in configuration mode, and another logical partition attempts to enter configuration mode, the attempt is rejected with a response code of '0104'X.

In LPAR mode, a logical partition must be authorized to change the I/O configuration. This is achieved by having the proper authorization specified on the LPSEC frame.

If the logical partition is not authorized, and attempts to enter configuration mode, the attempt is rejected with a response code of '0105'X.

In LPAR mode, if the logical partition issues a Store Configuration Information CHSC instruction, byte 3 of word 2 of the command-response block contains the logical partition number of the logical partition which initiated configuration mode. In BASIC mode, this byte of the command response block is zero.

For the Set Configuration Mode On command, in LPAR mode, the LPAR hypervisor places the logical partition number (LPID) in the command-request block. In BASIC mode, this field must be zero.

CHSC Subchannel, Subchannel Commands, and Facilities Affected

The LPAR hypervisor maintains the status of the CHSC Subchannel in its storage so that it can synchronize activity between the partition, the Service Processor (PCE), and the channel subsystem (CSS). System reset clears any pending status from the CHSC and resets the multi-bit lock state in the CHSC subchannel block to zero. CHSC command code processing sets and resets certain bits as described in the various CHSC Subchannel Lock State diagrams throughout this application.

The executions of TEST SUBCHANNEL (TSCH), MODIFY SUBCHANNEL (MSCH), and STORE SUBCHANNEL (STSCH) instructions are modified to work with the CHSC subchannels as described below. Information that must be returned to the CHSC issuer is constructed by the LPAR hypervisor and placed into the appropriate locations in the command-response block according to the definition of the CHSC instruction.

The MSCH is reissued by the LPAR hypervisor to a logical partition's CHSC subchannel to update the enable bit, the ISC#, and the interruption parameter.

CHSC Missing Interruption Handler (See Table 11)

This is a missing interruption handler for CHSC subchannels, which is invoked for logical partition execution of TSCH, STSCH, and MSCH instructions which refer to a CHSC subchannel. The LPAR hypervisor calls different modules to check for solicited or unsolicited status based on the value of the lock for the CHSC subchannel.

CHSC Modify Subchannel Simulation (See Table 8)

This processing occurs after invocation of the CHSC missing interruption handler. The operand of a MSCH is a path management control word(PMCW). The MSCH/STSCH lock is obtained before examining the value of the lock for the CHSC subchannel. The update of the PMCW is passed to the channel subsystem. If successful, the LPAR hypervisor updates its storage to reflect the change in the PMCW for the CHSC subchannel. If unsuccessful due to unsolicited status held pending at the channel subsystem, this status may be accepted and made pending. The MSCH/STSCH lock is released before completing execution of the MSCH instruction.

CHSC Store Subchannel Simulation (See Table 9)

This processing occurs after invocation of the CHSC missing interruption handler. The MSCH/STSCH lock is obtained before examining the value of the lock for the CHSC subchannel. For some values of the lock, the MSCH/STSCH lock is released and instruction execution is nullified. The asynchronous request count for the CHSC subchannel is fetched. If the value of the lock is not 14, the PMCW is taken from value maintained in the storage of the LPAR hypervisor and a Subchannel Channel Status Word(SCSW) is composed using an address of any current request block and the value of the function-active, function-pending, and status-pending fields implied by the value of the lock. This composition is repeated until the asynchronous request count for the CHSC subchannel at completion of the composition has not changed from the previously fetched value.

Otherwise, if the value of the lock is 14, a compare-and-swap attempts to change the value to 15. If successful, the PMCW and SCSW are composed from values maintained in the storage of the LPAR hypervisor and the value of the lock is returned to 14. If unsuccessful, this processing begins again for the new value of the lock. The MSCH/STSCH lock is released before completing execution of the STSCH instruction.

CHSC Test Subchannel Simulation (See Table 10)

This processing occurs after invocation of the CHSC missing interruption handler and after it has been determined that no storage operand exceptions prevent successful storing of a storage operand. For some values of the lock for the CHSC subchannel, instruction execution is nullified.

The asynchronous request count for the CHSC subchannel is fetched. If the value of the lock is not 14, a Subchannel Channel Status Word(SCSW) is composed using an address of any current request block and the value of the function-active, function-pending, and status-pending fields implied by the value of the lock. This composition is repeated until the asynchronous request count for the CHSC subchannel at completion of the composition has not changed from the previously fetched value. Instruction execution is completed with condition code 1.

Otherwise, if the value of the lock is 14, a compare-and-swap attempts to change the value to 15. If successful in changing the lock value to 15, an attempt is made to acquire the VIOQLOCK, which is the lock for the virtual I/O interruption queue to which the subchannel is assigned. If unsuccessful in acquiring the VIOQ-LOCK, the value of the lock for the CHSC subchannel is restored to 14 and the instruction is nullified. If successful in acquiring the VIOQLOCK, the CHSC subchannel is removed from any I/O interruption queue, the VIOQLOCK is released, status is stored in the storage operand from storage maintained for the CHSC subchannel by the LPAR hypervisor, status is cleared from storage maintained for the CHSC subchannel by the LPAR hypervisor, any unsolicited status is obtained from the channel subsystem and made pending in storage maintained for the CHSC subchannel by the LPAR hypervisor, and instruction execution is completed with CC=0.

CHSC Interruption Look For Status (See Table 12)

This processing occurs in response to an interruption presented by the Channel Subsystem for a CHSC subchannel. Solicited or unsolicited status may be pending.

Dynamic I/O Locking

Besides the multi-bit CHSC Subchannel lock, the LPAR hypervisor needs a MSCH/STSCH lock to maintain consistency between the MSCH and the STSCH command on the CHSC Subchannel.

In a Dynamic I/O environment, where one logical partition can be changing another logical partitions' I/O configuration, it is necessary to lock all logical partition's I/O configurations before proceeding with the Dynamic I/O configuration change. The logical partition in Configuration Mode obtains all the PICLOCKs before the LPAR hypervisor passes the CHSC command to the channel subsystem. See Table 13.

If all the PICLOCKs are not obtained in a reasonable time, the ones that were obtained must be released See Table 14. If the PICLOCKs are not obtained, the value of the CHSC Subchannel lock is changed from 4 to 16 using CS logic and an interruption is generated to the logical partition with a response value of X'0110'. If the PICLOCKs are successfully obtained, the value of the CHSC Subchannel lock is changed from 4 to 5 using compare and swap and the CHSC command is passed to the channel subsystem.

Many values of the lock for the CHSC subchannel cannot be present at completion of the attempt to acquire PICLOCKs for the request unless a logical partition system reset has occurred and the request has been cancelled.

There is a count of the number of CHSC instructions issued for the subchannel which is used to determine when a system reset has occurred and the command is no longer the active request. When the request is no longer the active request, any PICLOCKs which were obtained are released and the state is restored to a value of 4, in order to allow the active request to proceed.

Logical Partition System Reset (See Table 16)

If the Logical partition is in configuration mode, the configuration session is ended with an indication that the session was incomplete.

(See Table 15)

The resetting of the CHSC subchannel takes place prior to the resetting of the logical partition's I/O subchannels. The VIOQLOCK for the CHSC subchannel is obtained before examining the value of the lock for the CHSC subchannel. When the VIOQLOCK is not available, any pending interruptions are accepted before attempting to reacquire the VIOQLOCK. For some values of the lock, the VIOQLOCK is released and any pending interruptions are accepted before reacquiring the VIOQLOCK and repeating the process.

If the value of the lock was 14, a compare-and-swap attempts to change the value to 15. If successful in changing the lock value to 15, the CHSC subchannel is removed from any I/O interruption queue, the VIOQLOCK is released, status is cleared from storage maintained for the CHSC subchannel by the LPAR hypervisor, and the lock value is changed to 1.

If the value of the lock was 6, the reset of the CHSC subchannel enqueues itself to resume when an interruption is presented by the channel subsystem for the CHSC subchannel, and the VIOQLOCK is released.

If the value of the lock was 0, 2 or 4, a compare-and-swap attempts to change the value to 1.

When the value of the lock for the CHSC subchannel is changed to 1 by compare-and-swap, any unsolicited status for the CHSC subchannel is cleared from the channel subsystem and the PMCW is set to its initial value.

(See Table 4)

CRWs for the logical partition are cleared by storing zero into the AMCCODE values of the BFYAMC entries for its subchannels and clearing its BFYCBM bit map to zero.

I/O Configuration Changing CHSC Commands

Whenever a CHSC command is issued to change the I/O configuration, the LPAR hypervisor gets control. For the Add/Delete Channel Path CHSC commands it is necessary for the LPAR hypervisor to do some preprocessing. The LPAR hypervisor does only as much command-request-block validation as is needed to ensure that the proper order of condition code setting and program interruptions is maintained. The LPAR hypervisor then passes the CHSC command to the channel subsystem.

Once the channel subsystem has completed its processing of the configuration-change request, it signals the LPAR hypervisor with an I/O interruption. If the LPAR hypervisor determines that a good response code has been returned, it updates its I/O configuration control blocks to reflect what the channel subsystem currently has defined as determined by examination of the channel subsystem control blocks.

Exit of Configuration Mode

The completion of a Dynamic I/O configuration session can occur either because a logical partition in configuration mode executes a CHSC command to exit configuration mode, or because system reset is done to a partition in configuration mode. When configuration mode is terminated, the LPAR hypervisor updates BFYAMC entries for CRWs pending at the end of session. (See Table 3).

GLOSSARY OF TERMS

The following terms and acronyms are used in this document.

BFYAMC (Add Modify CRW table)

Contains information about the pending addition and modification CRWs.

BFYCBM (CRW Bit Map)

Each bit indicates whether or not a deletion CRW is pending for a subchannel.

BFYCDLRB

LPAR routine which builds or re-builds LPAR's I/O configuration control structures.

CC

Condition Code.

CHSC

Channel Subsystem Call.

Console Function Mode.

A partition is in console function mode when all of its logical processors are in a state so they are not running on a physical processor and will not be dispatched on a physical processor.

CRW

Channel Report Word.

CS

Compare and Swap instruction.

CSS

Channel Subsystem.

HCD (Hardware Configuration Dialog)

Interactive front-end guide that allows the user to define the hardware configuration.

HSA (Hardware System Area)

A logical area of central storage that is used to store Licensed Internal Code and control information (not addressable by programs).

IODF
I/O Definition File.
LPAR
Logical Partitioning.
LPID
Logical Partition ID.
LPSEC
Logical Partition Security Frame.
NEWSTATE
New state of the state engine employed to represent the CHSC subchannel.
OLDSTATE
Old state of the state engine employed to represent the CHSC subchannel.
PCE (Processor Controller Engine)
See Processor Controller.
PICL (Partition I/O Configuration Lock)
Lock that is held whenever a partition's I/O configuration is being changed.
PICLOCK
See PICL.
Processor Controller
The PCE provides support and diagnostic function for the central processors.
POR
Power On Reset.
Service Processor
See Processor Controller.
VIOQ
Virtual I/O Queue.

TABLE 1

CHSC Instruction Simulation Action Table

| State | Action |
|---|---|
| 0 | CC3 |
| 1 | nullify instruction |
| 2 | Compare & Swap from 2 to 3. For operations which may change the configuration and therefore require all of the PICI, locks, the new count value is loaded, the state is changed from 3 to 4, the new count value is passed in a stacked call or goto on the system SDXBK, and end instruction with CC1. For operations which are strictly informational and require no PICL locks, the LPAR hypervisor issures the real CSCH while in state 3. If the resulting condition code is 0, the LPAR hypervisor filters the response, sets state 2 and ends instruction with CC0 If the resulting condition code is 2, the LPAR hypervisor sets state 2 and ends instruction with CC2. If the resulting condition code is 1, the LPAR hypervisor changes the state to 9 and end instruction with CC1. |
| 3 | nullify instruction |
| 4 | CC2 |
| 5 | CC2 |
| 6 | CC2 |
| 7 | CC2 |
| 8 | CC2 |
| 9 | CC2 |
| 10 | CC2 |
| 11 | CC2 |
| 12 | CC2 |
| 13 | CC2 |
| 14 | CC2 |
| 15 | nullify instruction |
| 16 | CC2 |
| 17 | CC2 |
| 18 | CC2 |
| 19 | CC2 |
| 20 | nullify instruction |

TABLE 2

Subchannel Add/Modify CRW Code Values

| CRW State | Description |
|---|---|
| 0 | no creation or alteration CRW pending |
| 1 | alteration CRW pending immediately |
| 2 | alteration CRW pending at end of session |
| 3 | creation CRW pending immediately |
| 4 | creation CRW pending at end of session |

TABLE 3

Subchannel Add/Modify CRW Code Update When Config Mode Off is Processed

| CRW State | Action |
|---|---|
| 0 | none |
| 1 | none |
| 2 | If AMCLP#!=LPID,Compare&Swap from 2 to 1 Else Compare&Swap from 2 to 0. |
| 3 | none |
| 4 | If AMCLP#!=LPID,Compare&Swap from 4 to 3 Else Compare&Swap from 4 to 0. |

Note: This update cannot be performed from a stacked console function call because it occurs within console function mode reset, and any attempt to use STKCR would result in a deadlock.
Update the entries for all partitions in a single pass, updating the scan pointer to the minimum of its current value and (subchannel-1) for each entry changed to 1 or 3, keeping track of partitions for which the scan pointer was changed and had a previous value of X'0000FFFF'.
A bit map(which may be kept in a register), can be used to indicate the partitions for which an AMC state value has changed to 1 or 3, so that the scan pointer is updated only on the first occurrence. Another bit map(which may be kept in a register), can be used to indicate the partitions for which the scan pointer when updated was found to have previously been X'0000FFFF'.
For each such partition that turned out to be XA, make sure the partition is active, lock the CHCBK, test CHCRWCC1, set it to one and generate a CHCMCV MCVBLK if CHCRWCC1 was zero, and release the CHCBK lock.
For each partition for which a CHCMCV MCVBK was generated, go around its local cyclic list and call STKWB with PARM=SDXWKSCI to force and interruption scan.

TABLE 4

Subchannel Add/Modify CRW Code Update For Logical Partition I/O Subsystem Reset

| CRW State | Action |
|---|---|
| 0 | none |
| 1 | store 0 as new state value |
| 2 | store 0 as new state value |
| 3 | store 0 as new state value |
| 4 | store 0 as new state value |

Note: AMCLP# must match SDXLPID

TABLE 5

Subchannel Add/Modify CRW Code Update When Configured Path Mask Changes from Zero to Non-Zero

| CRW State | Action |
|---|---|
| 0 | Compare&Swap from 0 to 3 |

TABLE 5-continued
Subchannel Add/Modify CRW Code Update When Configured Path Mask Changes from Zero to Non-Zero

| CRW State | Action |
|---|---|
| 1 | Compare&Swap from 1 to 3 |
| 2 | Compare&Swap from 2 to 3 |
| 3 | none |
| 4 | none |

Note: This update is performed from console function mode. AMCLP# is always set for both XA and 370 partitions. After Compare&Swap to 3 for an XA partition, update the scan pointer for this partition to the signed minimum of its current value and (subchannel-1). If the previous value of the scan pointer was X'0000FFFF', lock the CHCBK, test CHCRWCC1, set it to one and generate a CHCMCV MCVBK if CHCRWCC1 was zero, and release the CHCBK lock.

TABLE 6
Subchannel Add/Modify CRW Code Update When Subchannel is Removed from Configuration

| CRW State | Action |
|---|---|
| 0 | store 0 as new state value |
| 1 | store 0 as new state value |
| 2 | store 0 as new state value |
| 3 | store 0 as new state value |
| 4 | store 0 as new state value |

TABLE 7
Subchannel Add/modify CRW Code Update When PIM changes from non-zero to a different non-zero value

| CRW State | Action |
|---|---|
| 0 | Compare&Swap from 0 to 2 |
| 1 | none |
| 2 | none |
| 3 | none |
| 4 | none |

TABLE 8
MSCH Instruction Simulation Action Table

| State | Action |
|---|---|
| 0 | Compare&Swap from 0 to 1, process PMCW |
| 1 | nullify instruction |
| 2 | Compare&Swap from 2 to 1, process PMCW |
| 3 | nullify instruction |
| 4 | CC2 |
| 5 | CC2 |
| 6 | CC2 |
| 7 | CC2 |
| 8 | CC2 |
| 9 | CC2 |
| 10 | CC2 |
| 11 | CC2 |
| 12 | nullify instruction |
| 13 | nullify instruction |
| 14 | CC1 |
| 15 | nullify instruction |
| 16 | nullify instruction |
| 17 | nullify instruction |
| 18 | nullify instruction |
| 19 | nullify instruction |
| 20 | nullify instruction |

Note: The STSCH lock for the CHSC subchannel is acquired after the missing interruption logic, after the VOPR macro is issued to fetch the PMCW, and before the state is examined for MSCH. It is released on all exits from the instruction.

TABLE 9
STSCH Instruction Simulation Action Table

| State | Action |
|---|---|
| 0 | SCSW no function active, no status pending |
| 1 | nullify instruction |
| 2 | SCSW no function active, no function pending, no status pending |
| 3 | nullify instruction |
| 4 | SCSW function active, function pending, no status pending |
| 5 | SCSW function active, function pending, no status pending |
| 6 | SCSW function active, function pending, no status pending |
| 7 | SCSW function active, function pending, no status pending |
| 8 | SCSW function active, subchannel active, no status pending |
| 9 | SCSW function active, function pending, no status pending |
| 10 | nullify instruction |
| 11 | SCSW function active, subchannel active, no status pending |
| 12 | nullify instruction |
| 13 | nullify instruction |
| 14 | Compare&Swap from 14 to 15, form SCSW, then restore to 14 |
| 15 | nullify instruction |
| 16 | nullify instruction |
| 17 | nullify instruction |
| 18 | nullify instruction |
| 19 | nullify instruction |
| 20 | nullify instruction |

Note: The STSCH lock for the CHSC subchannel is acquired after the missing interruption logic, before the state is examined for STSCH, and is released on all exits from the instruction. It is released before the VOPR macro to store the SCHIB.

TABLE 10
TSCH Instruction Simulation Action Table (after MIII)

| State | Action |
|---|---|
| 0 | CC3 |
| 1 | nullify instruction |
| 2 | CC1 SCSW no function active, no status pending |
| 3 | nullify instruction |
| 4 | CC1 SCSW function active, function pending, no status pending |
| 5 | CC1 SCSW function active, function pending, no status pending |
| 6 | CC1 SCSW function active, function pending, no status pending |
| 7 | CC1 SCSW function active, function pending, no status pending |
| 8 | CC1 SCSW function active, subchannel active, no status pending |
| 9 | CC1 SCSW function active, function pending, no status pending |
| 10 | nullify instruction |
| 11 | CC1 SCSW function active, subchannel active, no status pending |
| 12 | nullify instruction |
| 13 | nullify instruction |
| 14 | Compare&Swap from 14 to 15. Lock VIOQ if available; restore state and nullify instruction if not available. Dequeue interruption, unlock VIOQ, from SCSW from status, clear status from CHSC subchannel, set condition code 0, change state from 15 to 20, and call lookuns.parm=2. |
| 15 | nullify instruction |
| 16 | nullify instruction |
| 17 | nullify instruction |
| 18 | nullify instruction |
| 19 | nullify instruction |

TABLE 10-continued

TSCH Instruction Simulation Action Table (after MIII)

| State | Action |
|---|---|
| 20 | nullify instruction |

TABLE 11

Missing Interruption Logic for TSCH, STSCH, MSCH

| State | Action |
|---|---|
| 0 | none |
| 1 | nullify instruction |
| 2 | Conmpare&Swap from2 to 20, look for unsolicited status |
| 3 | nullify instruction |
| 4 | Compare&Swap from 4 to 20, look for unsolicited status |
| 5 | nullify instruction |
| 6 | none |
| 7 | none |
| 8 | Compare&Swap from 8 to 10, check for status in the real subchannel |
| 9 | Compare&Swap from 9 to 10, check for status in the real subchannel if there is no status pending, change the state in 9 if function pending is still one in the real subchannel, or changes the state to 8 when function pending is not one in the real subchannel. |
| 10 | none |
| 11 | none |
| 12 | none |
| 13 | none |
| 14 | none |
| 15 | none |
| 16 | nullify instruction |
| 17 | none |
| 18 | none |
| 19 | none |
| 20 | none |

TABLE 12

Look-for-Status Routine. Invoked on any sort of interruption for the CHSC subchannel

| State | Action |
|---|---|
| 0 | none (return to caller) |
| 1 | spin (open window for host interruptions and look again) |
| 2 | Compare&Swap from 2 to 20, look for unsolicited status |
| 3 | spin (open window for host interruptions and look again) |
| 4 | Compare&Swap from 4 to 20, look for unsolicited status |
| 5 | spin (open window for host interruptions and look again) |
| 6 | spin (open window for host interruptions and look again) |
| 7 | none (return to caller) |
| 8 | Compare&Swap from 8 to 10, check for status in the real subchannel |
| 9 | Compare&Swap from 9 to 10, check for status in the real subchannel if there is no status pending, it changes the state to 9 if function pending is still one in the real subchannel, or changes the state to 8 when fucntion pending is not one in the real subchannel. |
| 10 | spin (open window for host interruptions and look again) |
| 11 | none (return to caller) |
| 12 | none (return to caller) |
| 13 | none (return to caller) |
| 14 | none (return to caller) |
| 15 | none (return to caller) |
| 16 | spin (open window for host interruptions and look again) |
| 17 | none (return to caller) |
| 18 | none (return to caller) |
| 19 | none (return to caller) |
| 20 | spin (open window for host interruptions and look again) |

TABLE 13

Action Table On Successful Acquisition of PICLs

| State | Action |
|---|---|
| 0 | exit; unlock PICLs and go to LPAR's dispatcher. |
| 1 | exit; unlock PICLs and go to LPAR's dispatcher. |
| 2 | exit; unlock PICLs and go to LPAR's dispatcher. |
| 3 | exit; unlock PICLs and go to LPAR's dispatcher. |
| 4 | Compare&Swap from 4 to 5. Check count. If count does not match, unlock PICLs and restore to 4. |
| 5 | spin (open window for Host interruptions and look again) |
| 6 | exit; unlock PICLs and go to LPAR's dispatcher. |
| 7 | exit; unlock PICLs and go to LPAR's dispatcher. |
| 8 | exit; unlock PICLs and go to LPAR's dispatcher. |
| 9 | exit; unlock PICLs and go to LPAR's dispatcher. |
| 10 | exit; unlock PICLs and go to LPAR's dispatcher. |
| 11 | exit; unlock PICLs and go to LPAR's dispatcher. |
| 12 | exit; unlock PICLs and go to LPAR's dispatcher. |
| 13 | exit; unlock PICLs and go to LPAR's dispatcher. |
| 14 | exit; unlock PICLs and go to LPAR's dispatcher. |
| 15 | exit; unlock PICLs and go to LPAR's dispatcher. |
| 16 | spin (open window for Host interruptions and look again) |
| 17 | exit; unlock PICLs and go to LPAR's dispatcher. |
| 18 | exit; unlock PICLs and go to LPAR's dispatcher. |
| 19 | exit; unlock PICLs and go to LPAR's dispatcher. |
| 20 | spin (open window for Host interruptions and look again) |

TABLE 14

Action Table On Failure to Acquire PICLs

| State | Action |
|---|---|
| 0 | exit; go to LPAR's dispatcher. |
| 1 | exit; go to LPAR's dispatcher. |
| 2 | exit; go to LPAR's dispatcher. |
| 3 | exit; go to LPAR's dispatcher. |
| 4 | Compare&Swap from 4 to 16. Check count. If count does not match, restore state to 4. If count does match, change to state 17, set failure response and completion status. |
| 5 | spin (open window for Host interruptions and look again) |
| 6 | exit; go to LPAR's dispatcher. |
| 7 | exit; go to LPAR's dispatcher. |
| 8 | exit; go to LPAR's dispatcher. |
| 9 | exit; go to LPAR's dispatcher. |
| 10 | exit; go to LPAR's dispatcher. |
| 11 | exit; go to LPAR's dispatcher. |
| 12 | exit; go to LPAR's dispatcher. |
| 13 | exit; go to LPAR's dispatcher. |
| 14 | exit; go to LPAR's dispatcher. |
| 15 | exit; go to LPAR's dispatcher. |
| 16 | spin (open window for Host interruptions and look again) |
| 17 | exit; go to LPAR's dispatcher. |
| 18 | exit; go to LPAR's dispatcher. |
| 19 | exit; unlock PICLs and go to LPAR's dispatcher. |
| 20 | spin (open window for Host interruptions and look again) |

TABLE 15

System Reset Set Config Mode Off Action Table

| State | Action |
|---|---|
| 0 | Compare&Swap from 0 to 1. If in configuration mode for this partition, enable subchannel, change state to 3 and join code for 2 successfully changed to 3.<br>If not in configuration mode for this partition, do the following immediately rather than using the "System Reset Action Table." Disable physical CHSC subchannel and set ISC/Channel number to zero. Zero partition ISC or channel number. Unlock partition ISC/Channel interruption queue. Change state to 0 when finished. |

TABLE 15-continued
System Reset Set Config Mode Off Action Table

| State | Action |
|---|---|
| 1 | abend(endop synchronization error) |
| 2 | Compare&Swap from 2 to 3. If in configuration mode for this partition, do the following. Bump count. Issue Real CHSC. On CC 2, issue TSCH and retry CHSC. On CC1, enqueue for completion interruption by chaining CPEBK from LUCWENDQ with SAVER15 addressing a routine with fast/slow-retry locking of the VIOQ and excution of the "System Reset Action Table", release VIOQ lock by calling IOLRQ, change state to 9 and exit to dispatcher. On CC0, release VIOQ lock, process completion and change state to 2.<br>If not in configuratio mode for this partition, change state form 3 to 1, and do the following immediately rather than using the "System Reset Action Table." Disable physical CHSC subchannel and set ISC/Channel number to zero. Zero partition ISC or channel number. Unlock partition ISC/Channel interruption queue. Change state to 0 when finished. |
| 3 | abend (endop synchronization error) |
| 4 | Compare&Swap from 4 to 3. and join code for 2 successfully changed to 3. |
| 5 | spin(release VIOQ lock and opend window for Host interruptions) |
| 6 | enqueue to re-examine after interruption by chaining CPEBK from LUCWENDQ with SAVER15 addressing the fast/slow retry logic to acquire the VIOQ and re-examine the state for this state transition table from I,UCWENDQ, then unlock partition ISC/Channel interruption queue and go to LPAR's dispatcher. |
| 7 | enqueue to re-examine after interruption |
| 8 | enqueue to re-examine after interruption |
| 9 | enqueue to re-examine after interruption |
| 10 | enqueue to re-examine after interruption |
| 11 | enqueue to re-examine after interruption |
| 12 | enqueue to re examine after interruption |
| 13 | enqueue to re-examine after interruption |
| 14 | If subchannel is in partition ISC/Channel interruption queue, Compare&Swap from 14 to 15, clear status from CHSC, subchannel, call IOQDQ to dequeue the device, unlock partition ISC/Channel interruption queue, change state to 3, and join code for 2 successfully changed to 3. Else if VIOQDEFR=0, Compare&Swap from 14 to 3, and join code for 2 successfully changed to 3. Else release VIOQ lock and opend window for Host interruptions. |
| 15 | abend (endop synchronization error) |
| 16 | spin(release VIOQ lock and opend window for Host interruptions) |
| 17 | spin(release VIOQ lock and opend window for Host interruptions) |
| 18 | spin(release VIOQ lock and opend window for Host interruptions) |
| 19 | spin(release VIOQ lock and opend window for Host interruptions) |
| 20 | spin(release VIOQ lock and opend window for Host interruptions) |

Note: The VIOQ lock is acquired in the same way as for RESDD and QUIDD before the state of the virtual subchannel is examined.

TABLE 16
System Reset Action Table

| State | Action |
|---|---|
| 0 | Compare&Swap from 0 to 1. Disable physical CHSC subchannel and set ISC/Channel number to zero. Zero partition ISC or channel number. Unlock partition ISC/Channel interruption queue. Change state to 0 when finished. |
| 1 | abend(endop synchronization error) |
| 2 | Compare&Swap from 2 to 1. Disable physical CHSC subchannel and set ISC/Channel number to zero. Zero partition ISC or channel number. Unlock partition ISC/Channel interruption queue. Change state to 0 when finished. |
| 3 | abend(endop synchronization error) |
| 4 | Compare&Swap from 4 to 1. Disable physical CHSC subchannel and set ISC/Channel number to zero. Zero partition ISC or channel number. Unlock partition ISC/Channel interruption queue. Change state to 0 when finished. |
| 5 | spin (release VIOQ lock and open window for Host interruptions) |
| 6 | enqueue for interruption; chain CPEBK to re-acquire VIOQ lock and re-examine state from I,UCWENDQ, unlock partition ISC/Channel interruption queue and go to LPAR's dispatcher. |
| 7 | enqueue for interruption |
| 8 | enqueue for interruption |
| 9 | enqueue for interruption |
| 10 | enqueue for interruption |
| 11 | enqueue for interruption |
| 12 | enqueue for interruption |
| 13 | enqueue for interruption |
| 14 | If subchannel is in partition ISC/Channel interruption queue, Compare&Swap from 14 to 15, clear status from CHSC subchannel, call IOQDQ to dequeue the device, unlock partition ISC/Channel interruption queue, change state to 1, disable physical CHSC sub-channel and set ISC/Channel number to zero, zero partition ISC or channel number, unlock partition ISC/Channel interruption queue, and change state to 0 when finished. Else if VIOQDEFR=0, Compare&Swap from 14 to 1, disable physical CHSC subchannel and set ISC/Channel number to zero, zero partition ISC or channel number, unlock partition ISC/Channel interruption queue, and change state to 0 when finished. Else release VIOQ lock and open window for Host interruptions. |
| 15 | abend(endop synchronization error) |
| 16 | spin (release VIOQ lock and open window for Host interruptions) |
| 17 | spin (release VIOQ lock and open window for Host interruptions) |
| 18 | spin (release VIOQ lock and open window for Host interruptions) |
| 19 | spin (release VIOQ lock and open window for Host interruptions) |
| 20 | spin (release VIOQ lock and open window for Host interruptions) |

Note: The VIOQ lock is acquired in the same way as for RESDD and QUIDD before the state of the virtual subchannel is examined.

TABLE 17

Subchannel Add/Modify CRW Code Update When Dynamic I/O Command Causes a Logical Partition to Receive a new Device, or When PIM changes from zero to non-zero.

| CRW State | Action |
|---|---|
| 0 | store 4 as new state value |
| 1 | store 4 as new state value |
| 2 | store 4 as new state value |
| 3 | store 4 as new state value |
| 4 | store 4 as new state value |

What is claimed is:

1. A method for performing a global function in a logically partitioned data processing system managed by a hypervisor, said method comprising the steps of:
   a) establishing a first system in a first partition and a second system in a second partition;
   b) intercepting a request by said first system in said first partition for said global function, said global function characterized by potential affecting said second system in said second partition;
   c) verifying that the first system in said first partition is authorized to initiate said global function;
   d) initiating execution of said global function by a global function execution means, without first determining whether said global function affects said second partition; and
   e) determining, after completion of said global function, an impact of said global function on said second partition, and notifying said second system of the impact.

2. The method of claim 1 in which said global function is a dynamic system configuration change.

3. The method of claim 2 in which said global function execution means comprises:
   a) means for adding a device, not previously attached to said data processing system, to said data processing system without reinitializing said data processing system;
   b) means for deleting a device, previously attached to said data processing system, from said data processing system, without reinitializing said data processing system;
   and in which said notifying said second system comprises the steps of:
   c) immediately presenting a notification for a device deletion, by said means for deleting a device, to said second system; and
   d) deferring the presentation of said notification for a device addition, by said means for adding a device, to said second system.

4. The method of claim 3 in which said notification is a channel report word (CRW).

5. The method of claim 3 in which said step of determining comprises the step of comparing a pre-global function configured path mask with a post-global function configured path mask.

6. The method of claim 1 in which said step of determining comprises the step of comparing a pre-global function status with a post-global function status.

7. A method for performing a dynamic system configuration change in a logically partitioned data processing system managed by a hypervisor, said method comprising the steps of:
   a) establishing a first system in a first partition and a second system in a second partition;
   b) intercepting a request by a first system in a first partition for said dynamic system configuration change, said dynamic system configuration change characterized by potential affecting a second system in a second partition;
   c) verifying that the first system in said first partition is authorized to initiate said dynamic system configuration change;
   d) initiating execution of said dynamic system configuration change by an execution means, without first determining whether said dynamic system configuration change affects said second partition, said execution means comprising:
      i) means for adding a device, not previously attached to said data processing system, to said data processing system without reinitializing said data processing system;
      ii) means for deleting a device, previously attached to said data processing system, from said data processing system, without reinitializing said data processing system;
   e) determining, after completion of said global function, an impact of said dynamic system configuration change on said second partition, said step of determining further comprising the step of comparing a pre-dynamic system configuration change status with a post-dynamic system
   f) notifying said second system of said impact by:
      i) immediately presenting a channel report word for a device deletion, by said means for deleting a device, to said second system;
      ii) deferring the presentation of said channel report word for a device addition, by said means for adding a device, to said second system.

8. An apparatus for changing a system configuration in a logically partitioned data processing system, said system comprising a first logical partition and a second logical partition, and further comprising a hypervisor controlling said first and second partitions, said apparatus comparing:
   a) enter configuration mode means for serializing a request in said firs partition for said changing, said enter configuration mode means denoting that said first partition is in configuration mode after said serializing;
   b) Channel Subsystem Call (CHSC) means for relaying said request form said first partition to an I/O processor (IOP) to perform said changing after verification that said first partition is in said configuration mode;
   c) analysis means, within said hypervisor, for determining an effect of said changing on said second partition after said changing; and
   d) notification means, within said hypervisor, for notifying said second partition of said effect.

9. The apparats of claim 8 in which said notification means comprises a channel report word (CRW).

10. The apparatus of claim 9 in which said notification means further comprises immediate presentation means for immediate presentation of said CRW to said second partition when said effect is a device deletion, and deferred presentation means for deferred presentation of said CRW to said second partition when said effect is a device addition or modification.

11. The apparatus of claim 8 in which said analysis means comprises means for comparing a pre-change configuration representation with a post-change configuration representation.

12. An apparatus for changing a system configuration in a logically partitioned data processing system, said system comprising a first logical partition and a second logical partition, and further comprising hypervisor controlling said first and second partitions, said apparatus comparing:

a) enter configuration mode means for serializing a request in said first partition for said changing, said enter configuration mode means denoting that said first partition is in configuration mode after said serializing;

b) Channel Subsystem Call (CHSC) means for relaying said request from said first partition to an I/O processor (IOP) to perform said changing after verification that said first partition is in said configuration mode;

c) analysis means, within said hypervisor, for determining an effect of said changing on said second partition after said changing, said analysis means comparing means for comparing a pre-change configuration representation with a post-change configuration representation; and d) notification means, comprising a channel report word (CRW), within said hypervisor, for notifying sad second partition of said effect, said notification means further comprising immediate presentation means for immediate presentation of said CRW to said second partition when said effect is a device deletion, and deferred presentation means for deferred presentation of said CRW to said second partition when said effect is a device addition or modification.

* * * * *